United States Patent

Kouth et al.

[15] 3,640,022
[45] Feb. 8, 1972

[54] WINDOW-GUIDING DEVICE

[72] Inventors: Herbert Kouth, Kilianstadten; Fritz Marr, Offenbach, both of Germany

[73] Assignee: H. T. Golde GmbH, Frankfurt (Main), Germany

[22] Filed: Oct. 29, 1969

[21] Appl. No.: 872,041

[52] U.S. Cl. ..................................49/420, 49/348, 49/352, 49/362
[51] Int. Cl. .......................................E05f 11/38
[58] Field of Search ..................................49/348–353, 360, 49/361, 362, 227, 375, 376, 415–421

[56] References Cited

UNITED STATES PATENTS

| | | | |
|---|---|---|---|
| 2,326,532 | 8/1943 | Graebner | 49/420 |
| 3,078,120 | 2/1963 | Faber | 49/227 |
| 3,219,335 | 11/1965 | Burridge | 49/360 |

*Primary Examiner*—J. Karl Bell
*Attorney*—McGlew and Toren

[57] ABSTRACT

A window-guiding device particularly for an automobile window includes a guide tube which is adapted to be raised and lowered by a driving handle and which is secured to a carriage. The carriage carries a member which is engaged with the lower edge of the window and the carriage is provided with a plurality of guide rolls which are guided on respective opposite sides of an elongated guide rail or track member. The guide rail includes opposed track sides each with at least two track guide surfaces arranged at an angle to each other and which engage with respective rollers. The rollers engage the guide surfaces simultaneously with equal effective roll diameters.

10 Claims, 8 Drawing Figures

3,640,022

PATENTED FEB 8 1972

INVENTORS
HERBERT KOUTH
FRITZ MARR

BY
McGlew & Toren
ATTORNEYS

INVENTORS
HERBERT KOUTH
FRITZ MARR
BY
McGlew & Toren
ATTORNEYS

# WINDOW-GUIDING DEVICE

SUMMARY OF THE INVENTION

This invention relates in general to the construction of window operating mechanisms and in particular, to a new and useful guiding device for a sliding window particularly for a vehicle and which includes a carriage which supports the lower end of the window and which is guided by a guide rail member through rollers carried on the carriage which bear in opposite directions against rail surfaces of the guide member with equal roll diameters.

The present invention deals in particular with a window construction which includes a driving member which is moved upwardly and downwardly by rotation of a window handle and which is affixed to a portion of the movable carriage for shifting the window upwardly or downwardly. Known window guides of this kind employ guide rails formed from sheet metal strips of substantially U-shaped cross section with legs which are rolled in at the ends so that on both sides of the rail are provided guide tracks of a cross section convexly arched outwardly in approximately circular form. The guide rolls include running grooves which engage with the guide tracks and which are of correspondingly concave design to make positive contact therewith. With such a construction, the carriage movement along the guide rail can correspond only to a circumferential speed which is correlated directly to a certain roll diameter, each guide roller will make contact with different effective roll diameters due to the curved contact line between the running groove of the roller and the guide track of the guide rail so that the guide rolls will not roll off the guide tracks but rub against them. The resulting heavy motion, which leads to considerably higher driving torque requirements, becomes still more bothersome if the other guide rail is curved following the irregularly arcuate or spherically curved window pane which is in preferred use today. Another factor contributing to the heavy motion is that, with the known guide rails having open profiles, ti is very difficult to obtain an exact parallelism of the two guide tracks because of the inevitable manufacturing tolerance variances so that heavy motion or considerable play between the rolls and the guide rail must be accepted.

In another known form of construction, the rolls of the carriage are applied elastically, thereby avoiding play but this also increases the friction of the rolls on the rail and moreover the pressing springs cannot certainly prevent canting or tilting of the pane because the canting forces may be greater than the oppositely directed spring forces. All of the known window constructions have window guides with a further disadvantage which is that the open profile of the guide rails have main bending axes which are perpendicular to the plane so that due to the considerable lever effect at the pane the rails tend to have an undesirable spring action and do not rigidly retain the pane in every open position. In some constructions, this is further augmented in the other bending axis parallel to the pane due to the fact that with the use of only three guide rolls there is a large support span of the rolls on the rail and canting forces transmit considerable moments to the guide rail which will bring about elastic deformations thereof. A further common disadvantage to the guide rail constructions is that the carriage for the window pane and hence the pane itself tend, because of the convex guide tracks and concave running grooves, to rotate about the longitudinal axis of the guide rail. This tendency is increased the more the spacing between the guide rail tracks approaches the diameter of the convex or concave curvature of the tracks or of the grooves of the rollers.

Accordingly, it is an object of the invention to avoid the disadvantages of the known guide devices by providing a simple roll guide that presents a minimum of frictional resistance and little play and which provides engagement without canting or tilting about any of the axis extending horizontally in the plane of the pane or perpendicular thereto but also excludes rotations about the longitudinal axis of the guide rail.

The invention includes a guide rail member defining tracks on respective opposite sides thereof which are formed by two guide surfaces set at an angle to each other. The rolls of the carriage engage in the tracks with equal effective roll diameters. This results in an extremely stable guide situation because each roll rolls along the guide track which is divided into two guide surfaces along two circumferential lines spaced from each other without being able to give way laterally. Since the roll diameters which belong to the two circumferential lines are of the same size each roll rotates without slip so that only rolling friction occurs.

An advantageous form of construction of the invention provides guide tracks of substantially V-shaped cross section. The rolls engage preferably in the V-opening of convexly arched race formed symmetrically in respect to the central plane of the rollers.

The guide rail may be a shaped section of sheet metal or an extruded metal-shaped section. In an embodiment of the invention, which is preferred because of its particularly simple construction the guide rails consist of two sheet metal strips firmly connected together in mirrorlike symmetry and whose outer edges are bent outwardly for the formation of the guide surfaces. Such a profile which may be easily jointed together by spot welding presents a construction in which sufficient moments of resistance are available in both bending axes and it can, without impairment of stability of form and dimension, easily be bent in the longitudinal axis for adaption to arched window panes. Because of the mirror symmetry of the two rail halves which are produced with the same tools, the manufacturing tolerances of the guide tracks can be maintained within narrow limits, it being sufficient essentially to see to it that the edges of the two rail halves are parallel. Any parallel stagger of the two halves on the other hand does not harm because the rolls will always roll off with the circumferential lines of contact of equal diameter and the resulting spacing of the guiding tracks remains the same.

A particularly stable construction includes a carriage with four guide rolls which are arranged to bear against the guide rail in pairs from opposite sides. The two rolls assigned to one guide track have a smaller spacing than that of the other guide track and are preferably adjustably fastened to the carriage on an eccentric setting device. Such a construction permits a practically play free easily adjustable bearing of the rolls against the guide rail.

In a further embodiment the adjustable rolls are mounted in bearing parts which are fastened to the carriage for pivotal movement parallel with the roll plane. The pivot axes extend eccentrically to the roll axes and engage at the bearing blocks at a spaced distance from the roll axes corresponding to a multiple of the eccentricity of the pivot axis to the roll axis. Spring elements which are supported on, or suspended from, the carriage press to the adjustable rolls against the guide rails. By such an arrangement the rolls are always reliably urged against the guide track by a spring force while the reactive force which would cancel out the applying pressure is precluded because of the eccentric friction. Therefore, even great canting forces on the pane cannot cancel out the spring force of the adjustable rolls pressing against the guide rails. Because the adjustable rolls will always rest firmly against the guide rail, this form of construction, according to the invention, renders possible a practically play free conduction over the full length of the stroke.

Accordingly, it is an object of the invention to provide an improved guide construction for the guiding carriage of a windowpane particularly for vehicles which includes a guide member having a trackway defined on each side thereof by two guide surfaces set an angle to each other and wherein a carriage for the windowpane includes guide rollers which roll against the respective trackways with equally effective diameters on each side of the trackway.

A further object of the invention is to provide a trackway for the carriage of a windowpane which is adapted to be moved by a driven member which includes two mirrorlike elements which are connected together and defined guide groove tracks made up of the surfaces of the respective members which extend obliquely relative to each other.

A further object of the invention is to provide a window construction particularly for windows of an automobile which are simple in design, rugged in construction, and economical to manufacture.

The various features of novelty which characterize the invention are pointed out with particularity in the claims annexed to and forming a part of the specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
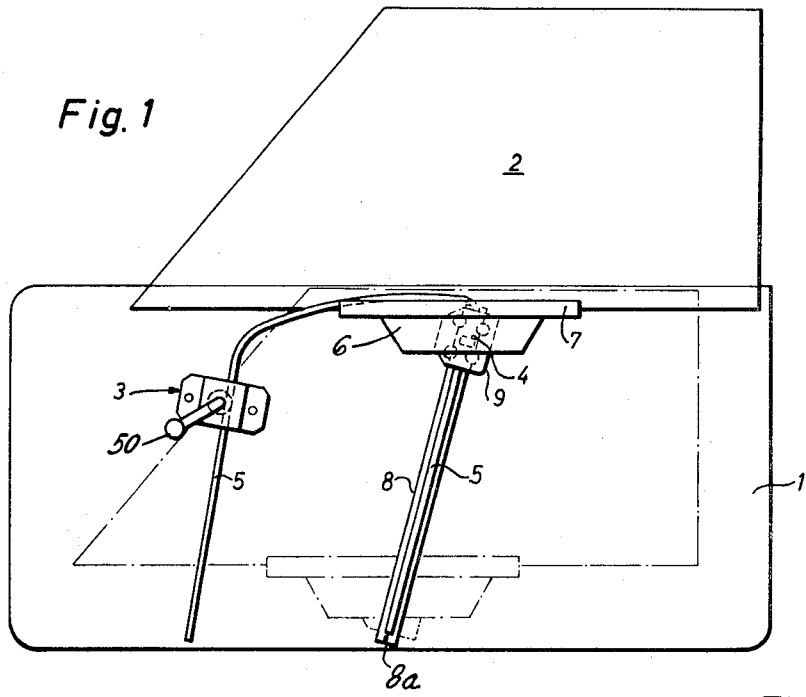
FIG. 1 is a somewhat schematic side elevational view of the interior of a door panel having a window guiding device constructed in accordance with the invention.
Figure 2:
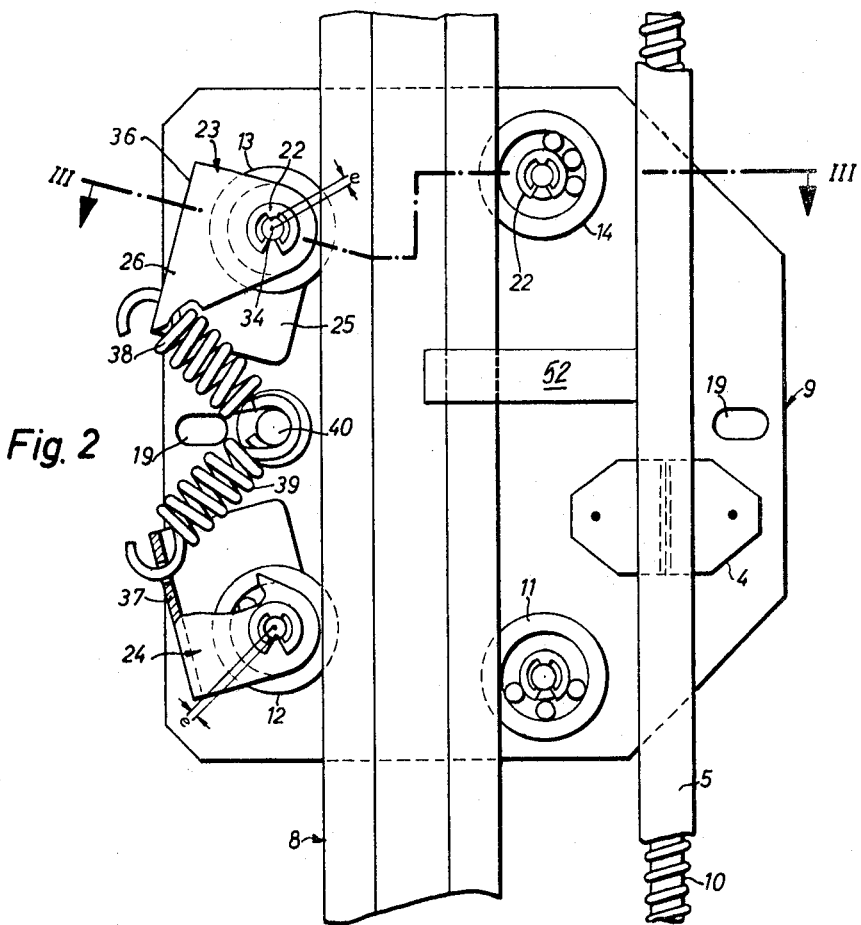
FIG. 2 is a enlarged elevational view of a portion of the mechanism indicated in FIG. 1.
Figure 3:
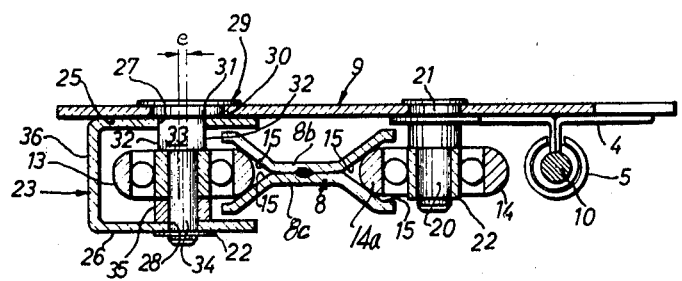
FIG. 3 is a section taken on the line III—III of FIG. 2.

Referring to the drawings in particular, the invention embodied therein in FIGS. 1, 2 and 3, comprises an automobile door 1 shown with its inner wall removed and which carries a frameless window pane 2 with a guiding device constructed in accordance with the invention. The pane 2 is movable from a closed position indicated in solid lines to a dotted position indicated in FIG. 1. Such movement is accomplished by rotation of a handle 50 to displace a guide rod 5 which carries a crossmember or catch 4 which in turn is firmly connected, for example, by screwing with a fishplate 6 or a carriage 9. The fishplate 6 carries a windowpane rail 7 which is firmly engaged along the lower edge of the pane 2.

In accordance with the invention, a guide rail 8 is mounted on the door 1 to extend generally obliquely to permit lowering movement of the pane from the solid line to the dotted line position indicated. For this purpose the guide rod catch 4 is secured to a carriage 9 having roller means which move in engagement with the guide rail member 8 to provide the necessary guiding action for the rail 7 which is affixed thereto. The guide tube 5 is mounted in a spaced parallel orientation in respect to the guide rail 8 and maintained in this position by means of intermediate webbing 52. The window regulator and the guiding device advantageously form a unit which may facilitate its assembly. The guide rail 8 is detachably fastened in the door panel by means of screws 8a. A threaded cable 10 is guided in a rigid manner through the guide tube 5 and it carries the catch 4 which in turn is fixed by spot welding to the carriage 9.

In accordance with a feature of the invention, the carriage 9 is provided with four guide rollers 11, 12, 13 and 14, two of which 11 and 14 bear against the guide rail 8 from the one side and two of which 12 and 13 bear against the guide rail from the opposite side. A feature of the construction is that the guide rail 8 is made up of two mirrorlike elements 8b and 8c which are arranged back to back and welded together. These elements 8b and 8c define obliquely extending surfaces 15, 15, 15 of each trackway on each side of the guide rail member 8. In the embodiment illustrated in FIG. 3, the guiding grooves of the trackway are substantially V-shaped. The rolls 11, 12, 13 and 14 which are designed as grooved ball bearings with an outer ring or rail 14a formed as a bearing race which is symmetrically and concavely arched outwardly and which engages in the V-shaped guide track. In this manner the two guide surfaces 15, 15 of each guide track are tangential to each of the rolls 11, 12, 13 and 14 as they roll off in two manually spaced circumferential lines of contact of equal diameter so that in accordance with the invention, a satisfactory rolling off is always ensured.

Figure 5:
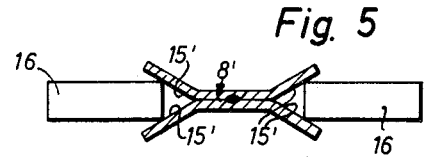
FIGS. 5, 6 and 7 are views similar to FIG. 3 of other embodiments of the invention.
Figure 6:
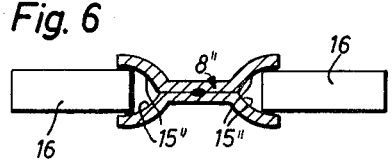
Figure 7:
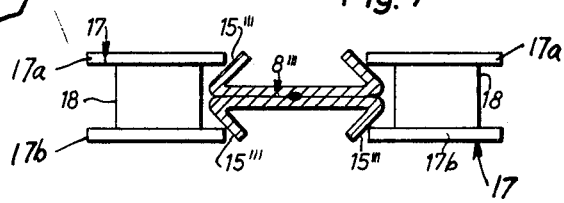

In FIGS. 5, 6 and 7, variations of the design of the trackways 8', 8'' and 8''' are indicated. The guide rail 8' of FIG. 5 is similar to that embodiment shown in FIG. 3 and includes planar guide surfaces 15', 15' extending at an angle to each other. They are engaged by rollers having cylindrical outer surfaces rather than convex surfaces as in the embodiment of FIG. 3.

In the FIG. 6 embodiment, the guide surfaces 15'', 15'' of the rail 8'' are arched concavely or they may be arched convexly if so desired. Rollers 16 and 16 having cylindrical surfaces also bear against the guide tracks in this embodiment.

In the embodiments of FIG. 7 a guide rail 8''' includes two identical sheet profiles which are bent outwardly along their outer edges and arranged back to back in mirrorlike fashion. The surfaces are bent back about 135° instead of 45° and therefore the guide surfaces 15''', 15''' form an obtuse angle in respect to each other. A guide roll 17 is provided with spaced cylindrical end portions 17a, 17b separated by a central cylindrical portion 18 in order to ensure that it will apply at the end portions 17a and 17b against both guide surfaces with contact lines of equal diameters.

As indicated in FIG. 2, the carriage 9 has a cutout 19 for its attachment to the lifter fishplate 6. As best seen in FIG. 3, the rolls 11 to 14 are arranged in one plane and parallel with the carriage 9. The more closely spaced rolls 12 and 13 are both within the supporting span of the rolls 11 and 14 at the guide rail and therefore in order to eliminate play the rolls 12 and 13 are advantageously prestressed into engagement with the guide rail.

As indicated in FIG. 3 the guide rollers 11 and 14 are attached on a free pin 20 of a flange bolt 21 which is riveted to the carriage 9 and secured by a snap spring 22. The rolls 12 and 13 are mounted so that they may be adjustably by means of a eccentric mounting element or applied by spring force as indicated in respect to the roll 13 shown in FIG. 3. For this purpose, the rolls 12 and 13 are mounted on bearing blocks 23 and 24 respectively, each of which is of U-shaped cross section with separate leg portions 25 and 26 which extend around each roller end and have bores 27 and 28 for receiving a bearing bolt 29. The bearing bolt 29 includes a step portion or cylindrical portion 31 which is rotatably mounted in a bore 30 of the carriage 9. An intermediate step portion 33 has flattened portions 32 and it is followed by another step bearing pin 34. Step portion 33 and the bearing pin 34 are coaxially arranged but offset relative to the portion 31 to provide an eccentricity which permits shifting of the rotatable pin portion 34 for the rollers in order to shift them toward and away from the guide rail 8. The roll 13 is applied over the bearing pin 34 along with a spacer sleeve 35. The axial securing of the bearing pin 34 after it is passed through the bore 28 of the associated bearing block is effected by a snap ring 22. Both the bearing block 23 and the roll 13 are pivotable about the portion 31 of the bearing bolt 29 to shift the axis of the roll or the bearing pin 34 to describe an arch about this pivot with an eccentricity $e$ as a radius as indicated in FIG. 2.

Coil springs 38 and 39 are pivotally mounted about their one ends at a pivot pin 40 on the carriage 9 and extend with their opposite end in respective webs 36 and 37 of the associated bearing blocks 23 and 24. The springs 38 and 39 urge the respective rolls 12 and 13 in a direction toward engagement with the associated guide track of the guide rail 8. Because the distance from the pivot axis of the bearing block to the point of spring engagement of the bearing block is greater than the eccentricity $e$, the spring can easily overcome the pivot bearing friction at the portion 31 and rotate the bearing block in the direction of application to the guide rail. In addition, canting forces produced by the movement of the pane 2 and acting against the rail 8 will not push the rolls 12 and/or 13 back because of the friction present at the portion 31 and the bores 30 of each pin 29. Therefore guide rails on the track will remain without play even in such a situation. In FIG. 3, in order to show up the eccentricity e, the bearing bolt 29 is illustrated as being rotated counterclockwise by about 45° against the true position of the eccentricity as indicated in FIG. 2 so that the eccentric stagger will be located in the plane of the drawing.

Figure 4:
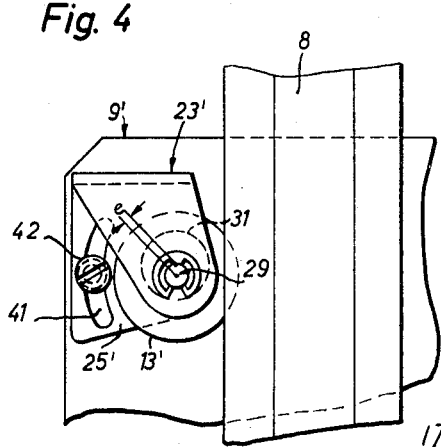
FIG. 4 is a partial view similar to FIG. 2 but of another embodiment of the invention.

In the alternate embodiment indicated in FIG. 4, the upper setting roll 13' of a carriage 9' is mounted without a spring biasing and the lower roller may be similarly arranged. In this example, leg 25' of a bearing block 23' is provided with a circular arch-shaped slot 41 having a center curvature located on the axis of the step 31 of a bearing pin 29 identical with that used in the other embodiment. A fixing screw 42 is passed through the slot 41 and threaded into a correspondingly threaded bore in the carrier 9'. After the fixing screw 42 is loosened the bearing block 23' can be pivoted about the mounting bearing portion 31 whereby the roll 13' is moved toward or away from the guide rail 8 as a result of the eccentricity e as in the embodiment illustrated in FIG. 2. The adjusted position is then secured by tightening the screw 42.

Figure 8:
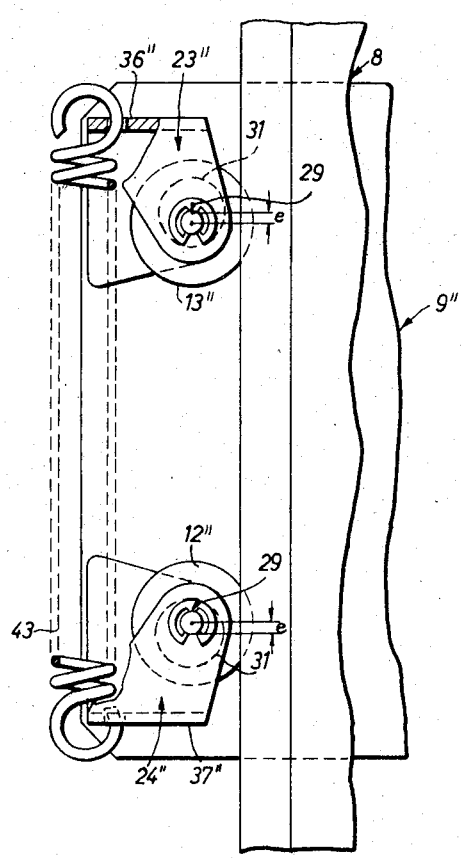
FIG. 8 is a view similar to FIG. 2 of another embodiment of the invention.

A slightly different form of construction but similar to that of FIG. 4 is shown in FIG. 8. In this construction, there are no fixing screws but rolls 12'' and 13'' are mounted on bearing blocks 23'' and 24'' which are urged in a rail engaging position by a single spring 43 which is engaged with respective outer walls 36'' and 37'' of the bearing blocks. This construction permits the use of only a single spring, without the necessity that the spring engaged on the carriage plate 9.

The guide device of the invention may be used equally as well with a scissor type, rope type or any other type regulator in addition to the cable window regulator indicated. In the case or rope regulators the rope passed over rolls is fastened to the carriage 9. Arm regulators can be mounted to engage by their actuating arm at the carriage or at the lifting rail or fishplate.

What is claimed is:

1. A window guiding device particularly for an automobile passenger car having window panes which move upwardly and downwardly without lateral guidance comprising a window pane carriage arranged to be secured to the lower end of a window pane, at least one guide rail running in the general direction of the up and down closing and opening movement of the window pane and having a guide track on each side formed by two guide surfaces set at an angle to each other, and at least one guide roller rotatably mounted on said carriage on each side of said guide track and being in rolling engagement with each of the guide surfaces of the respective tracks with equal effective roll diameters, each guide surface in said guide tracks presenting a line of contact with an engaged said guide roller.

2. A window guiding device, according to claim 1, wherein said guide rail includes tracks on each side formed by surfaces of V-shaped cross section, said guide rollers being rotatable ball bearings having a convexly arched outer race engaging in the V-shaped cross section and being symmetrically positioned in respect to said guide tracks.

3. A window guiding device, according to claim 1, wherein said guide rail comprises two substantially identical metal strips firmly connected together in mirror symmetry and having outer edges extending outwardly to form an opened end receiving track.

4. A window guiding device, according to claim 1, including at least four guide rolls rotatably mounted on said carriage arranged in pairs on respective opposite sides of said guide rail and including adjustable means for mounting said guide rollers to permit movement toward and away from said guide rail.

5. A window guiding device, according to claim 4, wherein said mounting means include pivotal bearing blocks, a pivot bolt pivotally supporting said bearing blocks on said carriage, said pivot bolt including a rotatable stepped bearing portion rotatably supported said pivot pin on said carriage, and an intermediate eccentric section rotatably supporting said bearing block and rotatably supporting a respective roller, said pin being rotatable in its support on said carriage to move said bearing block with said roller through an arch toward and away from engagement with said rail having a radius equal to the eccentricity of the mounting of said intermediate step portion.

6. A window guiding device, according to claim 5, including spring means engaged with said bearing block for urging said block in a direction toward engagement with said rail.

7. A window guiding device, according to claim 6, wherein said spring means includes a separate spring for each bearing block, said spring comprising a coil spring having one end secured to said carriage and an opposite end engaged with said bearing block.

8. A window guiding device, according to claim 1, including a mounting pin for each roller having a bearing portion rotatably supported on said carriage and including an eccentric pin portion, a bearing block for each roller rotatably carried on said eccentric pin portion and rotatably supporting said roller on said pin portion, said rollers comprising at least one pair of rollers on each side of said rail, and a spring engaged between the bearing blocks of the pairs of rollers on a respective side of said rail and urging said bearing blocks in a direction to rotate to present the associated roller carried thereby in engagement with the associated track on said rail.

9. A window guiding device, according to claim 1, including a bearing pin supported on said guide carriage having an eccentric pin portion rotatably supporting said roller, said pin being rotatable on said carriage to move said roller toward and away from said guide rail.

10. A window guiding device, according to claim 1, wherein said guide rail comprises two strip elements with identical configuration arranged back to back in mirrorlike fashion and secured together, said strip elements having outer ends extending obliquely backwardly and in opposite directions and defining a convex rail surface, said roller comprising a roller having a center cylindrical portion and a disc portion at each end of greater diameter, said disc portion at each end being in engagement with each respective end portion of said rail.

* * * * *